United States Patent
Wentz et al.

(10) Patent No.: US 10,830,309 B2
(45) Date of Patent: Nov. 10, 2020

(54) CHAIN DRIVE SYSTEM HAVING ANTI-ROTATION FEATURES BETWEEN PIVOT PIN AND GUIDE LINK AND RELATED ASSEMBLY METHOD

(71) Applicant: BorgWarner Inc., Auburn Hills, MI (US)

(72) Inventors: Travis J. Wentz, Rochester, MI (US); Bruce A. Churchill, Groton, NY (US)

(73) Assignee: BorgWarner Inc., Auburn Hills, MI (US)

( * ) Notice: Subject to any disclaimer, the term of this patent is extended or adjusted under 35 U.S.C. 154(b) by 275 days.

(21) Appl. No.: 16/019,577

(22) Filed: Jun. 27, 2018

(65) Prior Publication Data
US 2020/0003275 A1 Jan. 2, 2020

(51) Int. Cl.
| F16G 13/06 | (2006.01) |
| B21L 9/06 | (2006.01) |
| F16G 13/04 | (2006.01) |
| F16G 1/24 | (2006.01) |

(52) U.S. Cl.
CPC .............. *F16G 13/06* (2013.01); *B21L 9/065* (2013.01); *F16G 1/24* (2013.01); *F16G 13/04* (2013.01)

(58) Field of Classification Search
CPC . F16G 13/04; F16G 13/06; F16G 5/18; B21L 9/00; Y10T 29/49908
USPC .................................................. 474/212, 226
See application file for complete search history.

(56) References Cited

U.S. PATENT DOCUMENTS

| 958,676 A | * | 5/1910 | Dodge | F16G 13/04 474/213 |
| 1,511,822 A | * | 10/1924 | Belcher | B21L 9/00 219/666 |
| 3,595,098 A | * | 7/1971 | Kumakichi | F16G 13/06 474/206 |
| 4,250,764 A | * | 2/1981 | Grant | F16G 13/07 474/207 |
| 4,915,511 A | * | 4/1990 | Kotegawa | B65G 17/38 384/127 |
| 5,362,282 A | * | 11/1994 | Lickton | F16G 13/06 474/220 |
| 5,700,217 A | * | 12/1997 | Wakabayashi | F16G 13/04 474/214 |
| 6,077,181 A | * | 6/2000 | Kanehira | F16G 13/04 474/202 |
| 6,203,460 B1 | * | 3/2001 | Parks | F16G 5/18 474/206 |
| 6,612,103 B2 | * | 9/2003 | Matsuda | B21L 9/065 474/213 |
| 7,048,664 B2 | * | 5/2006 | Kotera | F16G 13/04 474/212 |
| 7,048,665 B2 | * | 5/2006 | Ledvina | F16G 5/18 474/212 |
| 7,056,248 B2 | * | 6/2006 | Butterfield | F16G 13/04 474/212 |

(Continued)

*Primary Examiner* — Henry Y Liu
(74) *Attorney, Agent, or Firm* — Burris Law, PLLC

(57) ABSTRACT

A chain drive system having chain links, guide links disposed on opposite lateral sides of the chain links, and pivot pins that extend through the chain links and are fixedly coupled to the guide links. Mating anti-rotation features are employed between each pivot pin and a corresponding one of the guide links to resist rotation between the pivot pin and the guide link.

13 Claims, 8 Drawing Sheets

(56) References Cited

U.S. PATENT DOCUMENTS

| | | | | |
|---|---|---|---|---|
| 7,059,985 B2* | 6/2006 | Markley | ................. | F16G 13/04 |
| | | | | 474/206 |
| 7,150,142 B2* | 12/2006 | Wilkie | ................... | B65G 17/20 |
| | | | | 59/78 |
| 7,404,778 B2* | 7/2008 | Butterfield | ............. | F16G 13/04 |
| | | | | 474/212 |
| 7,600,633 B2* | 10/2009 | Rathbun | ................. | B21K 1/00 |
| | | | | 198/850 |
| 7,942,772 B2* | 5/2011 | Sonoda | .................. | F16G 13/04 |
| | | | | 474/206 |
| 8,920,272 B2* | 12/2014 | Tokita | .................... | F16G 13/04 |
| | | | | 474/212 |
| 2006/0100047 A1* | 5/2006 | Churchill | ................. | F16H 7/18 |
| | | | | 474/109 |
| 2014/0335988 A1* | 11/2014 | Motoshima | ............ | F16G 13/04 |
| | | | | 474/214 |
| 2016/0312855 A1* | 10/2016 | Fujiwara | ............... | F16G 13/04 |
| 2017/0051565 A1* | 2/2017 | Wright | ................... | E21B 19/08 |
| 2017/0234373 A1* | 8/2017 | Palazzolo | ........... | B60K 17/344 |
| | | | | 192/84.6 |
| 2018/0017132 A1* | 1/2018 | Sano | ....................... | F16G 13/06 |

\* cited by examiner

CHAIN DRIVE SYSTEM HAVING ANTI-ROTATION FEATURES BETWEEN PIVOT PIN AND GUIDE LINK AND RELATED ASSEMBLY METHOD

FIELD

The present disclosure relates to a chain drive system having anti-rotation features between a pivot pin and a guide link, as a well as a related assembly method for forming a chain drive system.

BACKGROUND

This section provides background information related to the present disclosure which is not necessarily prior art.

Chain drive systems employ a chain to transmit rotary power between a plurality of sprockets. The chains are commonly formed of chain links that are pivotally coupled to guide links via pivot pins. The pivot pins are commonly staked to the guide links to inhibit relative rotation and axial movement between the pivot pins and the guide links. It would be beneficial to provide improved rotational resistance between the pivot pins and the guide links to preserve the integrity of the staking so that the chain is relatively more robust and durable.

SUMMARY

This section provides a general summary of the disclosure, and is not a comprehensive disclosure of its full scope or all of its features.

In one form, the present disclosure provides a chain drive system that includes a plurality of chain links, a plurality of first guide links, a plurality of pivot pins, at least one pair of anti-rotation features. Each of the chain links has a link body that defines a pair of chain link apertures. Each of the first guide links has a first guide body that defines a pair of first guide apertures. Each of the first guide links is disposed in proximity to an adjacent pair of the chain links such that one of the first guide apertures is aligned to one of the pair of chain link apertures in a first one of the adjacent pair of the chain links and a second one of the first guide apertures is aligned to one of the chain link apertures in the other one of the adjacent pair of the chain links. The pivot pins are received through the first guide apertures and the chain link apertures to pivotally couple the chain links and the first guide links to one another. The at least one pair of anti-rotation features includes a recessed anti-rotation feature and a male anti-rotation feature. The recessed anti-rotation features are formed into the first guide body of each of the first guide links and are disposed proximate an associated one of the first guide apertures. The male anti-rotation features are formed on associated ones of the pivot pins and are received into corresponding recessed anti-rotation features.

In another form, the present disclosure provides a method for forming a chain drive system. The method includes: providing an adjacent pair of chain links, each of the chain links having a link body that defines a pair of chain link apertures; providing a first guide link having a first guide body that defines a pair of first guide apertures and a first recessed anti-rotation feature; aligning the first guide link to the adjacent pair of chain links such that one of the first guide apertures is aligned to one of the pair of chain link apertures in a first one of the adjacent pair of the chain links and a second one of the first guide apertures is aligned to one of the chain link apertures in the other one of the adjacent pair of the chain links; inserting a first pivot pin through the one of the first guide apertures and the one of the chain link apertures in the first one of the adjacent pair of chain links; and upsetting the first pivot pin to form a first male anti-rotation feature in the first recessed anti-rotation feature to thereby non-rotatably couple the first pivot pin to the first guide link.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 8:
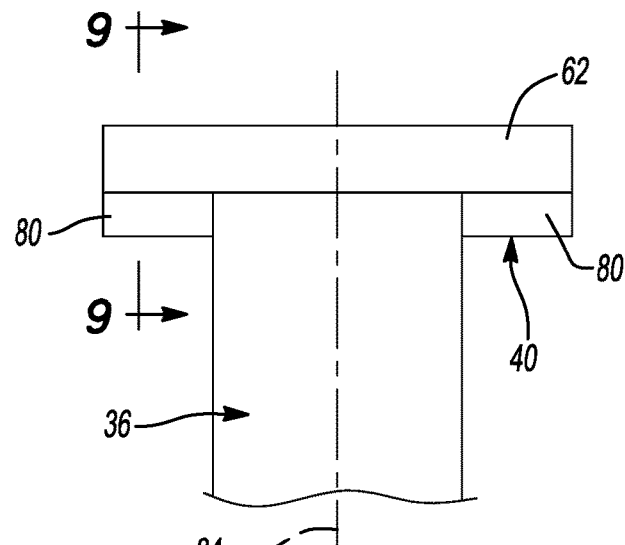
FIG. 8 is a side elevation view of a portion of the pivot pin.
Figure 10:
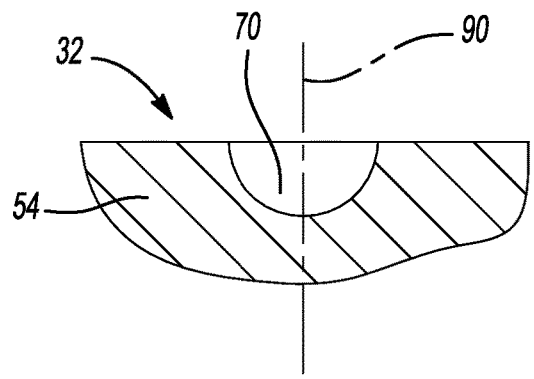
FIG. 10 is a section view similar to that of FIG. 6, but depicting an alternatively constructed recessed anti-rotation feature.
Figure 11:
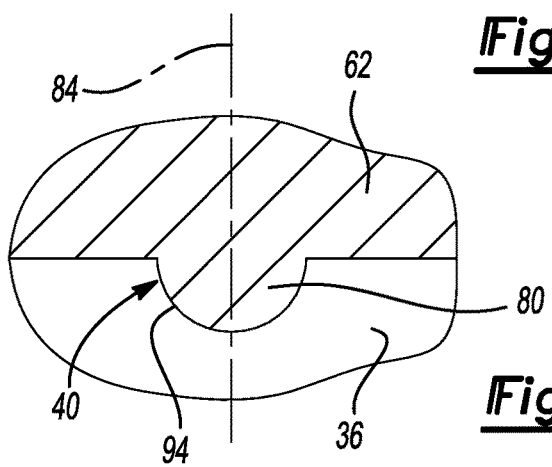
Figure 12:
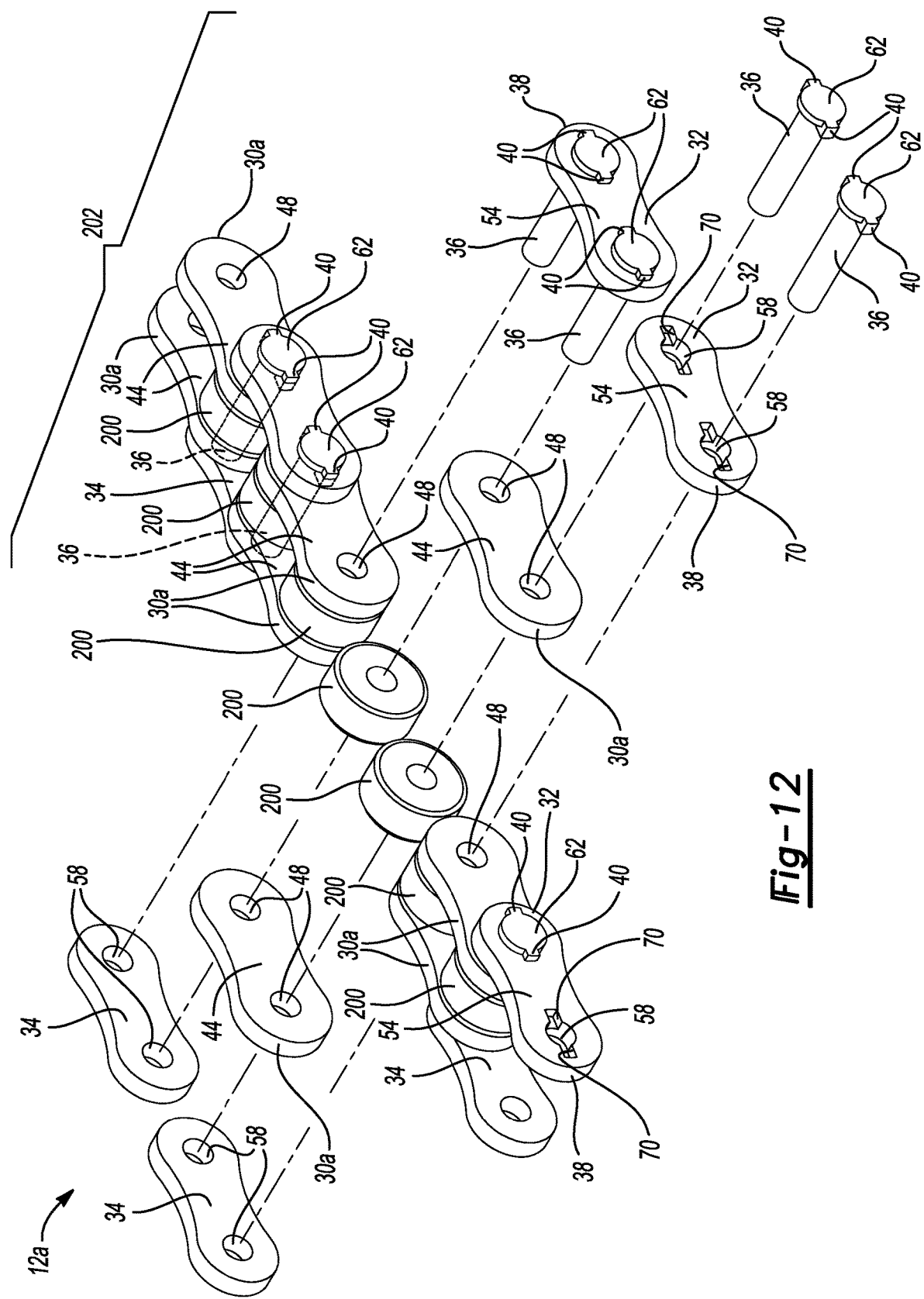
Figure 13:
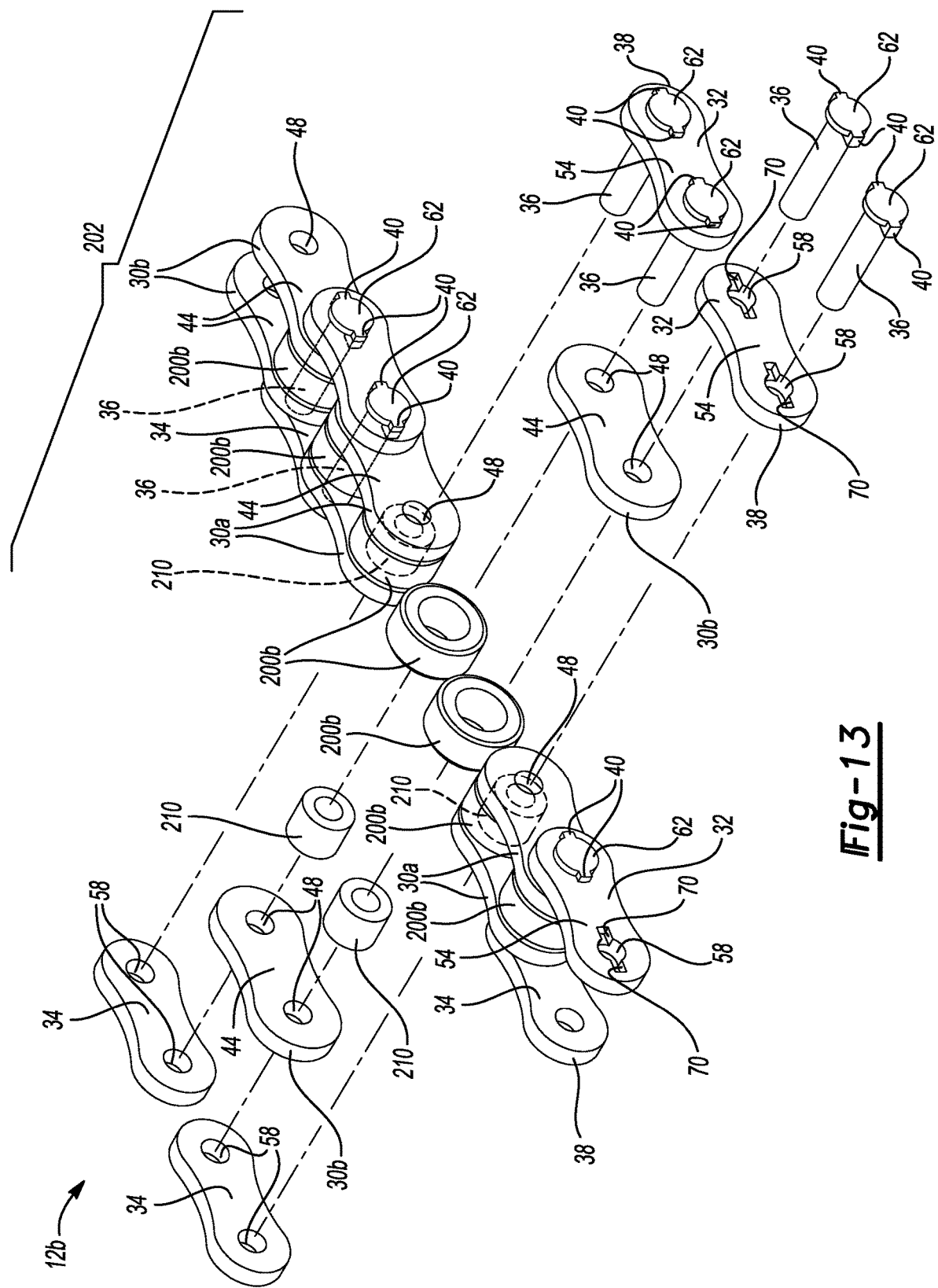

FIG. 11 is a view similar to that of FIG. 8, but depicting the pivot pin with an alternately constructed male anti-rotation feature that is configured to engage with the alternatively constructed recessed anti-rotation feature of FIG. 10; and FIGS. 12 and 13 are exploded perspective views of portion of other chain drive systems constructed in accordance with the teachings of the present disclosure.

Corresponding reference numerals indicate corresponding parts throughout the several views of the drawings.

DETAILED DESCRIPTION

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
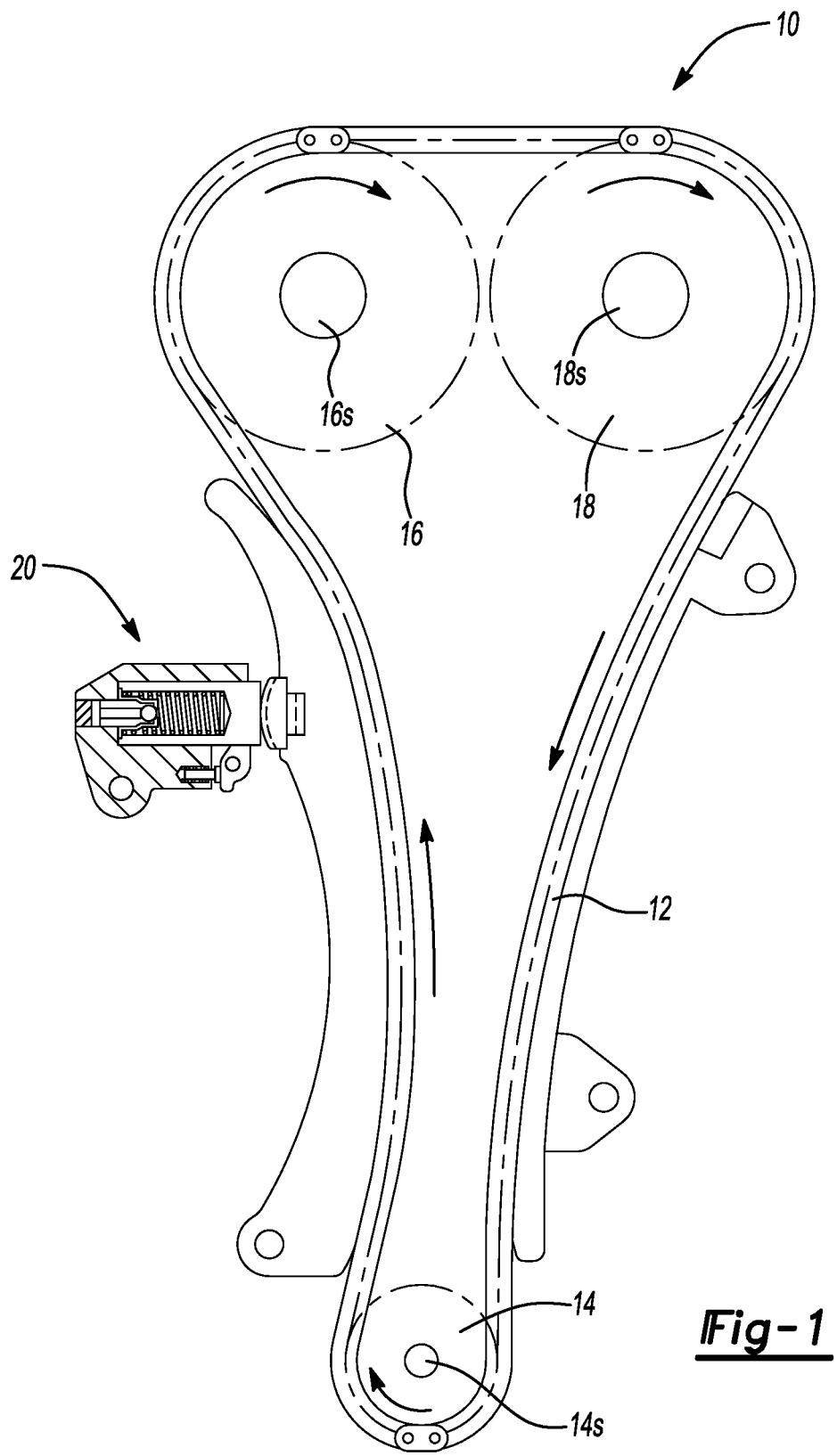
FIG. 1 is an elevation view of a chain drive system constructed in accordance with the teachings of the present disclosure.

With reference to FIG. 1, an exemplary chain drive system constructed in accordance with the teachings of the present disclosure is generally indicated by reference numeral 10. The chain drive system 10 can include a chain assembly 12, a plurality of sprockets 14, 16 and 18 and an optional chain tensioner 20. Each of the sprockets 14, 16 and 18 is coupled for rotation to a respective shaft 14s, 16s, and 18s so that rotary power input to the chain drive system 10 from the shaft 14s that is rotatably coupled to sprocket 14 is transmitted to the sprockets 16 and 18 (and their associated shafts 16s and 18s) through the chain assembly 12. The chain tensioner 20 can conventionally be employed to provide a desired load on the chain assembly 12.

Figure 2:
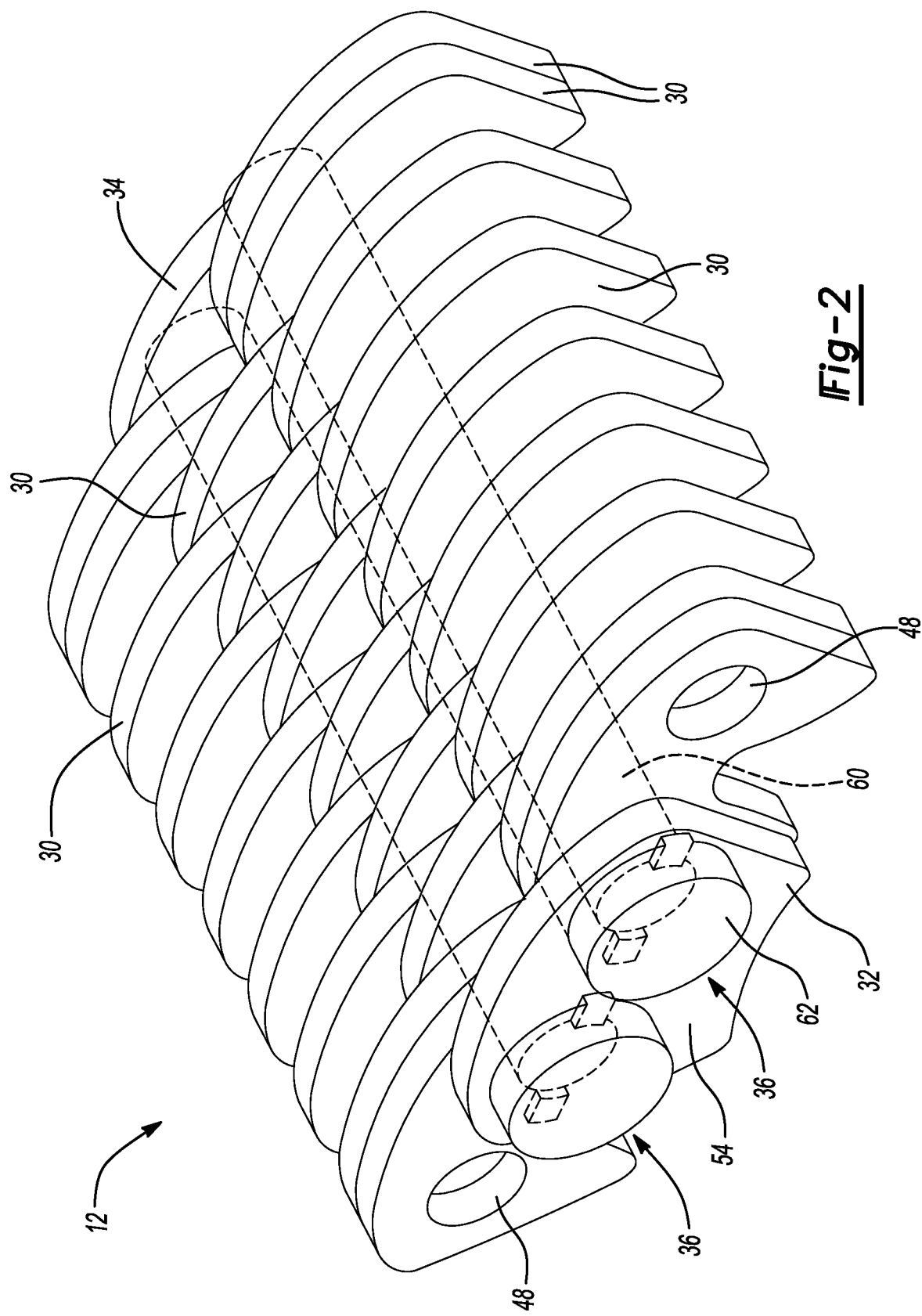
FIG. 2 is a perspective view of a portion of the chain drive system of FIG. 1 illustrating a chain assembly in more detail.
Figure 3:
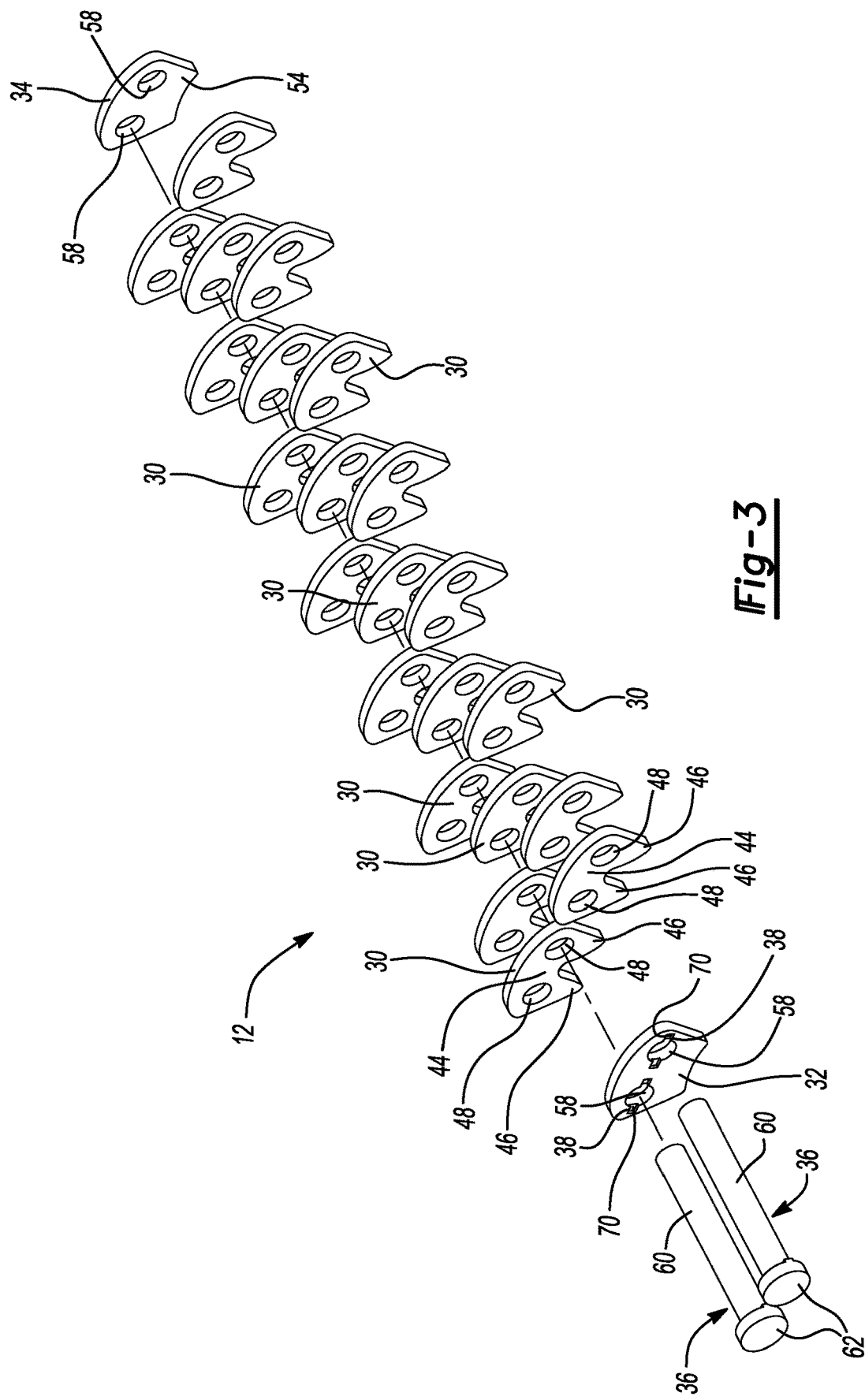
FIGS. 3 and 4 are front and rear perspective views, respectively, of the chain assembly.
Figure 4:
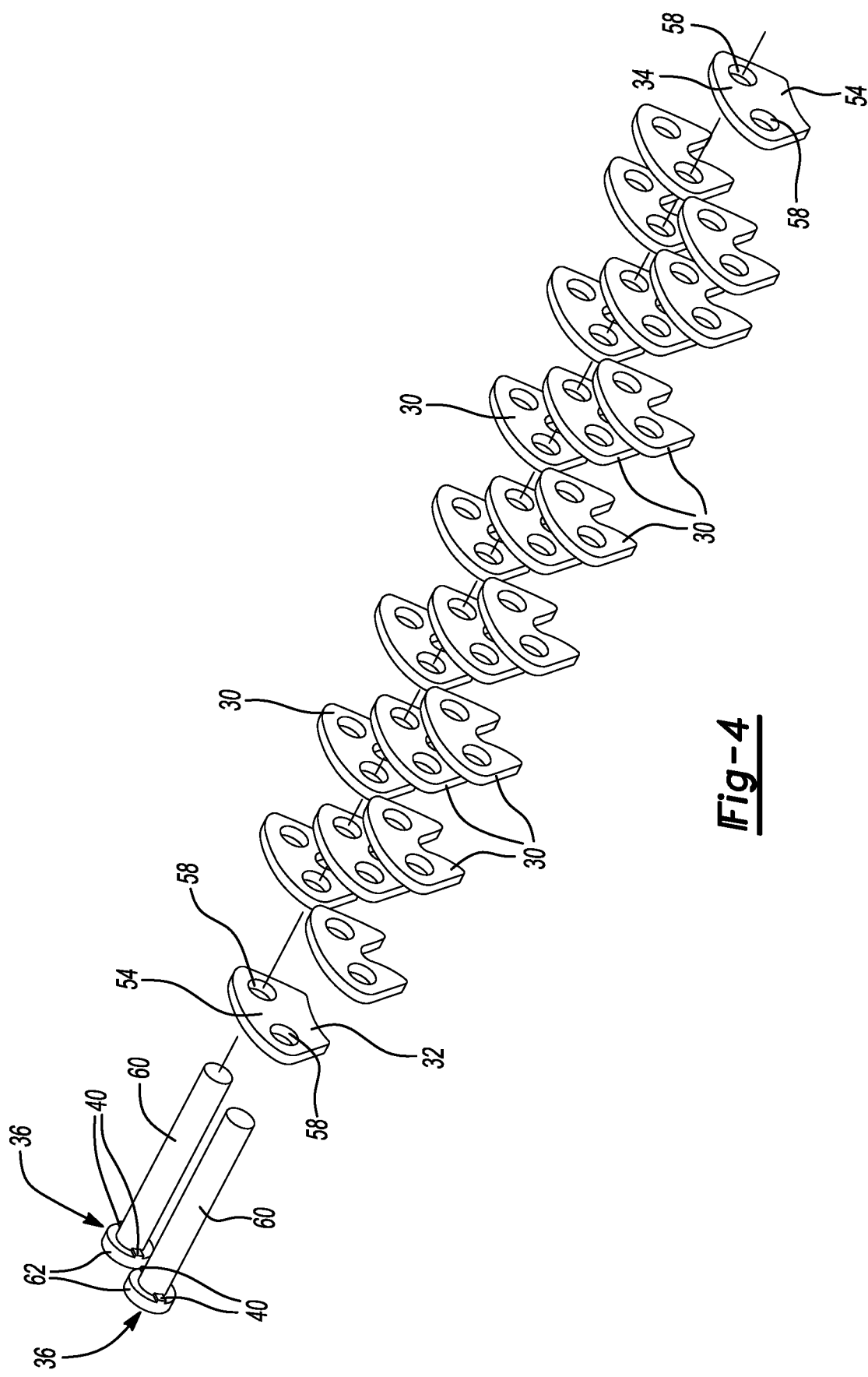

With reference to FIGS. 2 through 4, the chain assembly 12 can include a plurality of chain links 30, a plurality of first and second guide links 32 and 34, respectively, a plurality of pivot pins 36, a plurality of recessed anti-rotation features 38 and a plurality of male anti-rotation features 40. The chain links 30 can be formed of an appropriate steel material and can have the form of conventional "inverted tooth" or "silent chain" chain links and as such, each of the chain links 30 has a link body 44 and a pair of chain teeth 46 that extend from the link body 44. The link body 44 can define a pair of link apertures 48. The chain links 30 can be disposed in several strata in which the chain links 30. Each stratum of the chain links 30 can comprise one or more layers or levels of chain links 30 that are disposed adjacent to one another such that the chain teeth 46 of one of the chain links 30 in a given layer are spaced apart from the chain teeth 46 of the adjacent chain links 30. In the particular example provided, the chain links 30 of the chain assembly 12 are arranged in thirteen different strata, with the first and thirteenth strata having two layers of chain links 30 and the remaining strata having but a single layer of chain links 30.

The first and second guide links 32 and 34 can be generally similar in their construction and as such, a discussion of the first guide links 32 will suffice. Each of the first guide links 32 can be formed of a steel material and can have a guide body 54 that defines a pair of guide apertures 58. The first guide links 32 can be abutted to a first side of the chain links 30 such that each of the first guide links 32 spans an adjacent pair of the chain links 30 in the first stratum of chain links 30, a first one of the guide apertures 58 in the guide body 54 is aligned to one of the chain link apertures 48 in a first one of the adjacent pair of chain links 30, and a second one of the guide apertures 58 in the guide body 54 is aligned to one of the chain link apertures 48 in the other one of the adjacent pair of chain links 30.

Similarly, the second guide links 34 can be abutted to a second, opposite side of the chain links 30 such that each of the second guide links 34 spans an adjacent pair of the chain links 30 in the thirteenth stratum, a first one of the guide apertures 58 in the guide body 54 is aligned to one of the chain link apertures 48 in a first one of the adjacent pair of chain links 30 and a second one of the guide apertures 58 in the guide body 54 is aligned to one of the chain link apertures 48 in the other one of the adjacent pair of chain links 30.

Each of the pivot pins 36 can be formed of an appropriate steel material and can have a pin body 60 and an optional head 62. In the example provided, the pin body 60 is shaped as a right circular cylinder that is somewhat smaller in diameter than the link apertures 48 (to thereby permit the chain links 30 to pivot about the pin bodies 60), but it will be appreciated that the pin body 60 could be shaped differently. If included, the head 62 can be unitarily and integrally formed with the pin body 60, for example through upsetting, and can be somewhat larger in size (e.g., diameter) that the pin body 60.

Figure 5:
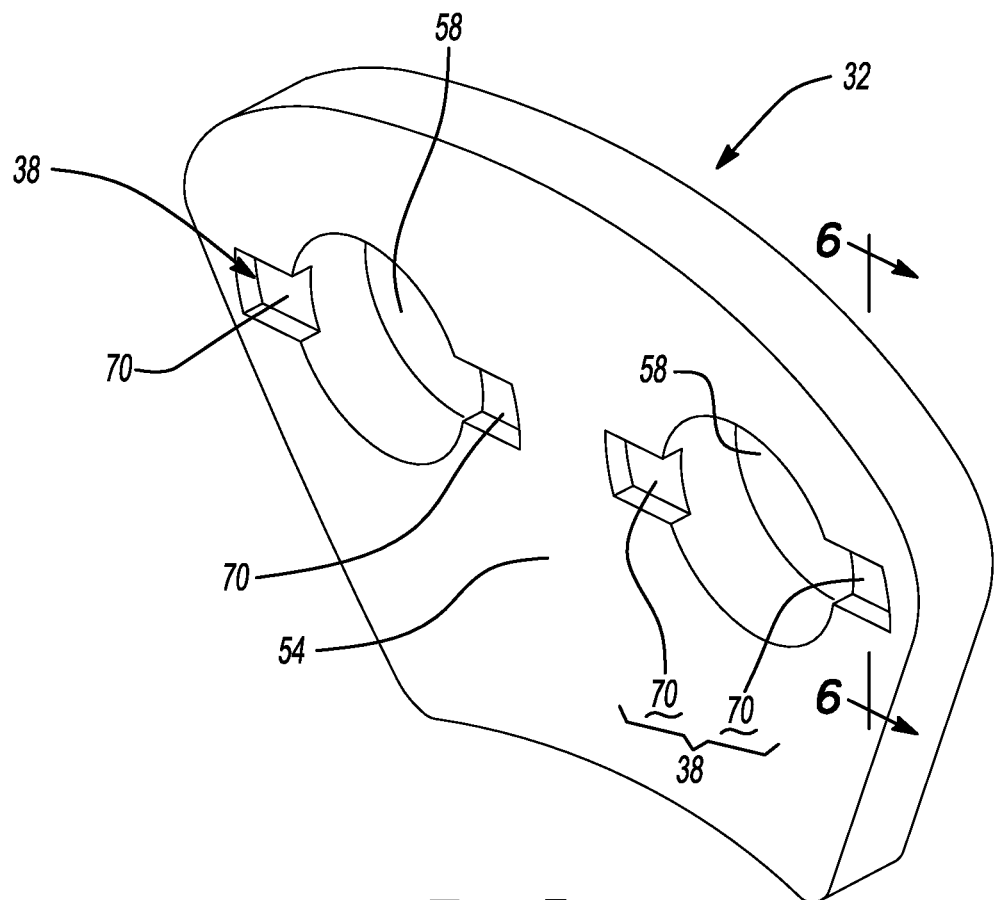
FIG. 5 is a perspective view of a portion of the chain assembly illustrating a guide link in more detail.
Figure 6:
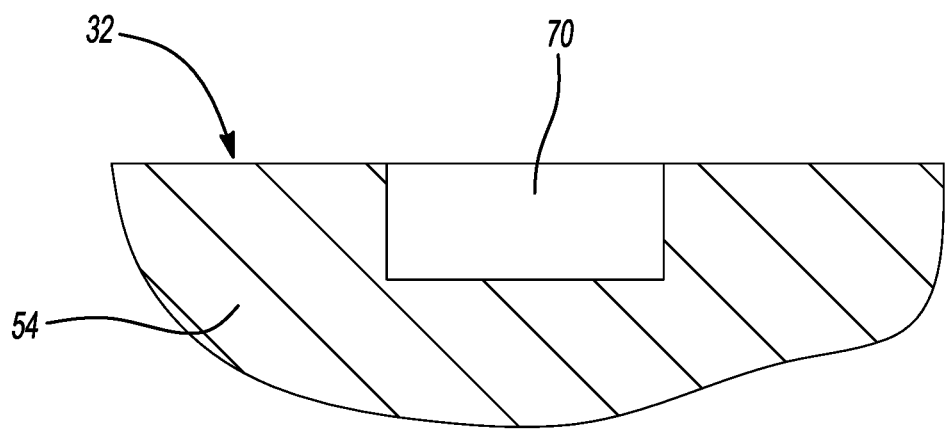
FIG. 6 is a section view taken along the line 6-6

With reference to FIGS. 3, 5 and 6, the recessed anti-rotation features 38 can be formed into the first guide link 32 and/or the second guide link 34 proximate the first guide apertures 58. In the example provided, a pair of the recessed anti-rotation features 38 are formed in the link body 44 of the first guide link 32 and each recessed anti-rotation feature 38 comprise a pair of recesses 70 that are formed into the outer surface of the link body 44 and which intersect and extend radially outwardly from a corresponding one of the guide apertures 58. If the first guide links 32 are formed via stamping or blanking, the recesses 70 can be formed into the link body 44 as part of that process, for example prior to or simultaneous with the formation of the guide apertures 58 in the link body 44.

Figure 7:
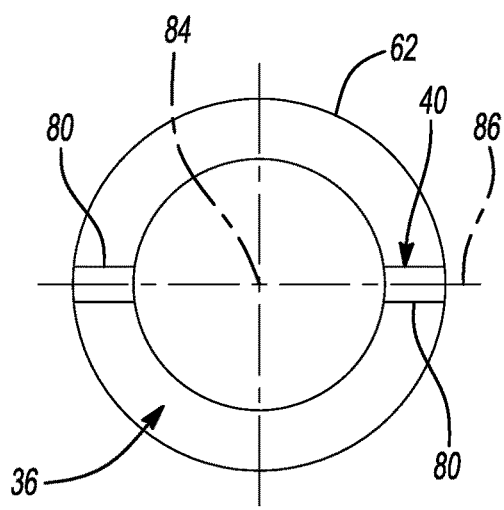
FIG. 7 is a rear view of a portion of the chain assembly illustrating a pivot pin in more detail.
Figure 9:
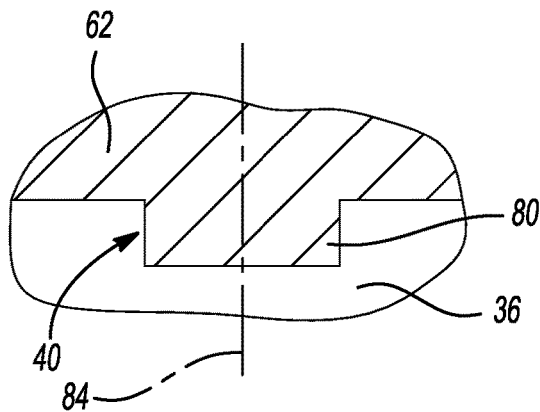
FIG. 9 is a sectional view of a portion of the pivot pin taken along the line 9-9 of FIG. 8.

With reference to FIGS. 7 through 9, each of the male anti-rotation features 40 can be formed on an associated one of the pivot pins 36 and are configured to matingly engage an associated one of the recessed anti-rotation features 38. In the example provided, each of the male anti-rotation features 40 comprises a pair of segments 80 that are formed on an underside of the head 62. Each of the segments 80 can extend in a radial direction relative to a longitudinal centerline 84 of a pin body 60 of a corresponding one of the pivot pins 36 and can conform to a corresponding one of the recesses 70 in an associated one of the recessed anti-rotation features 38. In the example shown, each of the segments 80 intersects and extends radially outwardly from the pin body 60. Each segment 80 can have a segment centerline 86 that extends perpendicular to the longitudinal centerline 84 of the pin body 60. If desired, each segment 80 can be symmetric about an associated plane that includes the associated segment centerline 86 and the longitudinal centerline 84 of the pin body 60 of the corresponding one of the pivot pins 36. Moreover, the male anti-rotation features 40 can be configured so that their height (e.g., distance between the underside of the head 62 and an outer edge of the segment 80 that faces away from the head 62) can be uniform over the width of the segment 80.

The male anti-rotation features 40 can be seated into the recessed anti-rotation features 38 during the assembly of the chain assembly 12 to aid in resisting relative rotation between the pivot pins 36 and the first guide link 32. For example, cylindrical rods (not shown) could be inserted into the guide apertures 58 in the first and second guide links 32 and 34 and the link apertures 48 in the chain links 30, the cylindrical rods could be upset to simultaneously to drive material into recessed anti-rotation features 38 and form the male anti-rotation features 40 and optionally to form the heads 62 of the pivot pins 36. The pin bodies 60 can be secured to the second guide link 34 in any desired manner, such as staking.

While the recessed anti-rotation features 38 have been illustrated as having recesses 70 with a depth that is uniform across their width and the male anti-rotation features 40 have been illustrated and described as having a uniform height across their width, it will be appreciated that the recessed anti-rotation features 38 and the male anti-rotation features 40 could be formed differently, as is shown in FIGS. 10 and 11, respectively. In FIG. 10, the recess 70 is illustrated as having a depth that decreases in magnitude with increasing distance from a centerline 90 of the recess 70, while in FIG. 11 the segment 80 is illustrated as having a height (i.e., a distance between the underside of the head 62 and the outer edge 94 of the segment 80) that decreases in magnitude with increasing distance from the longitudinal centerline 84 of the pivot pin 36.

While the chain assembly 12 has been illustrated and described as having recessed anti-rotation features 38 that are formed in the link bodies 44 of the first guide links 32, it will be appreciated that one of the recessed anti-rotation features 38 could be formed in the link body 44 of a first guide link 32 and that a second one of the recessed anti-rotation features 38 could be formed in the link body 44 of a second guide link 34. In a chain assembly 12 configured with sets of first and second guide links 32 and 34 in this manner, male anti-rotation features 40 on one of the pivot pins 36 would be received into the recessed anti-rotation features 38 in the first guide link 32 of the set, while male anti-rotation features 40 on another of the pivot pins 36 would be received into the recessed anti-rotation features 38 formed in the second guide link 34 of the set.

With reference to FIG. 12, a portion of another chain drive system constructed in accordance with the teachings of the present disclosure. The chain drive system include a chain assembly 12a that is similar to the chain assembly 12 of FIG. 1 except that the chain assembly 12a is constructed as a roller chain. In this regard, the chain links 30a are formed without teeth (i.e., the chain links 30a have a link body 44 that defines a pair of link apertures 48) and the chain assembly 12a includes a plurality of hollow rollers 200 that are each disposed between laterally offset pairs of the chain links 30a. Each pair of the laterally offset chain links 30a and each pair of the hollow rollers 200 that span between the laterally offset chain links 30a will be referred to herein as being a chain link unit 202. Each of the pivot pins 36 is received through an associated one of the hollow rollers 200 to thereby pivotally couple each of the guide links 34 to the adjacent axial ends of a pair of axially adjacent chain link units 202. Accordingly, each of the pivot pins 36 supports an associated one of the hollow rollers 200 for rotation thereon. As in the previous example, male anti-rotation features 40 on the pivot pins 36 are received into the recessed anti-rotation features 38 to inhibit relative rotation between the pivot pins 36 and the guide links 34.

The example of FIG. 13 is generally similar to that of FIG. 12, except that the chain assembly 12b is of a bushed roller type. In this regard, the chain assembly 12b includes a plurality of hollow bushings 210, with each of the hollow bushings 210 being received between a pair of the laterally offset chain links 30b. If desired, the hollow bushings 210 can be fixedly coupled to the chain links 30b. The hollow rollers 200b can be received about and rotate on the hollow bushings 210. The chain assembly 12b can otherwise be constructed in a manner that is similar to that of the roller chain-type chain assembly 12a that is described above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A chain drive system comprising:
    a plurality of chain links, each of the chain links having a link body that defines a pair of chain link apertures;
    a plurality of first guide links, each of the first guide links having a first guide body that defines a pair of first guide apertures, each of the first guide links being disposed in proximity to an adjacent pair of the chain links such that one of the first guide apertures is aligned to one of the pair of chain link apertures in a first one of the adjacent pair of the chain links and a second one of the first guide apertures is aligned to one of the chain link apertures in the other one of the adjacent pair of the chain links; and
    a plurality of pivot pins received through the first guide apertures and the chain link apertures to thereby pivotally couple the chain links and the first guide links to one another;
    wherein at least one recessed anti-rotation feature is formed into the first guide body of each of the first guide links, each of the at least one recessed anti-rotation features being disposed proximate an associated one of the first guide apertures and receiving a male anti-rotation feature formed on an associated one of the pivot pins to thereby non-rotatably couple the associated one of the pivot pins a corresponding one of the first guide links.

2. The chain drive system of claim 1, further comprising a plurality of second guide links, each of the second guide links having a second guide body that defines a pair of second guide apertures, the chain links being disposed laterally between the first guide links and the second guide links, each pair of the second guide apertures receiving the pivot pins that extend through the first guide apertures in an associated one of the first guide links.

3. The chain drive system of claim 2, wherein a first recessed anti-rotation feature is formed proximate the first one of the guide apertures in each of the first guide links, and wherein a second recessed anti-rotation feature is formed proximate the second one of the guide apertures in each of the first guide links.

4. The chain drive system of claim 3, wherein the male anti-rotation features are received into each of the first and second recessed anti-rotation features.

5. The chain drive system of claim 1, wherein each of the male anti-rotation features is formed on a head of a corresponding one of the pivot pins.

6. The chain drive system of claim 5, wherein each of the male anti-rotation features comprises one or more segments that extend in a radial direction relative to a longitudinal centerline of a pin body of the corresponding one of the pivot pins.

7. The chain drive system of claim 6, wherein the one or more segments intersect and extend radially outwardly from the pin body of the corresponding one of the pivot pins.

8. The chain drive system of claim 6, wherein each of the one or more segments has a segment centerline that extends perpendicular to the longitudinal centerline of the pin body of the corresponding one of the pivot pins and wherein each of the one or more segments is symmetric about a plane that includes the associated segment centerline and the longitudinal centerline of the pin body of the corresponding one of the pivot pins.

9. The chain drive system of claim 8, wherein the segments are contoured such that a distance between the head and an outer edge of a corresponding one of the segments decreases in magnitude with increasing distance from the longitudinal centerline of the corresponding one of the pivot pins.

10. The chain drive system of claim 1, further comprising a sprocket that is meshingly engaged with the chain teeth.

11. The chain drive system of claim 1, wherein the chain links have a pair of chain teeth that extend from the link body.

12. The chain drive system of claim 1, further comprising a plurality of hollow rollers, each of the hollow rollers being disposed laterally between a pair of the chain links and receiving one of the pivot pins therethrough.

13. The chain drive system of claim 12, further comprising a plurality of bushings, each of the bushings being disposed about an associated one of the pivot pins and being received in an associated one of the hollow rollers.

* * * * *